(12) United States Patent
Deng et al.

(10) Patent No.: US 8,300,802 B2
(45) Date of Patent: Oct. 30, 2012

(54) ADAPTIVE FILTER FOR USE IN ECHO REDUCTION

(75) Inventors: Hongyang Deng, Austin, TX (US); Roman A. Dyba, Austin, TX (US); Perry P. He, Mountain View, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 1460 days.

(21) Appl. No.: 11/897,872

(22) Filed: Aug. 31, 2007

(65) Prior Publication Data

US 2009/0060167 A1 Mar. 5, 2009

(51) Int. Cl.
*H04M 9/00* (2006.01)

(52) U.S. Cl. .................................... 379/406.08; 370/290

(58) Field of Classification Search ... 379/406.01–406.16, 3; 381/71.11–71.12, 381/305; 370/286–290, 437
See application file for complete search history.

(56) References Cited

U.S. PATENT DOCUMENTS

| | | | |
|---|---|---|---|
| 5,951,626 A | 9/1999 | Duttweiler | |
| 6,442,274 B1 * | 8/2002 | Sugiyama | 379/406.08 |
| 6,526,141 B2 | 2/2003 | Benesty et al. | |
| 6,771,772 B1 | 8/2004 | Tanrikula | |
| 6,907,064 B1 * | 6/2005 | Tokunaga et al. | 375/232 |
| 7,450,518 B2 * | 11/2008 | Yousef | 370/242 |
| 7,672,445 B1 * | 3/2010 | Zhang et al. | 379/406.01 |
| 7,920,711 B2 * | 4/2011 | Takashima et al. | 381/307 |
| 8,073,133 B2 * | 12/2011 | Ishiguro et al. | 379/406.08 |
| 2003/0235294 A1 | 12/2003 | Dyba et al. | |
| 2007/0036344 A1 * | 2/2007 | Lin et al. | 379/406.08 |
| 2008/0175375 A1 * | 7/2008 | Ishiguro et al. | 379/406.08 |
| 2008/0205633 A1 * | 8/2008 | Dyba et al. | 379/406.08 |

* cited by examiner

*Primary Examiner* — Md S Elahee
*Assistant Examiner* — Akelaw Teshale

(57) ABSTRACT

Methods and corresponding systems in an adaptive filter include calculating a signal estimator output using filter coefficients, and calculating an error signal. Next, a coefficient threshold is determined. Thereafter, for each filter coefficient, a first step size is assigned to filter coefficients with a magnitude less than the coefficient threshold, and a second step size is assigned to filter coefficients with a magnitude greater than or equal to the coefficient threshold. Finally, the filter coefficients are updated using the first and second step sizes and the error signal. The coefficient threshold can be selected as the average of the magnitudes of the filter coefficients. Alternatively, the coefficient threshold can be selected as the Mth largest of the filter coefficients ranked in order of magnitude. In one embodiment, the first step size can be less than one and the second step size can be greater than one.

20 Claims, 3 Drawing Sheets

ADAPTIVE FILTER FOR USE IN ECHO REDUCTION

BACKGROUND

1. Field

This disclosure relates generally to communication systems and equipment, and more specifically, to techniques and apparatus for adaptive filtering, and adaptive filtering in an echo reduction system in a communication system.

2. Related Art

An adaptive filter is a filter having a transfer function that is adjusted according to an adaptation algorithm. Because of the complexity of the adaptation algorithms, many adaptive filters use digital filters and digital signal processing to adapt the filter transfer function based on, for example, the input signals.

For some applications, such as echo cancellation, adaptive filters can be used since some parameters of the desired processing operation (for instance, the properties of the system (or circuit) that produces the echo signal) are not known in advance.

Echo can have a major effect on voice quality in telecommunication networks (such as the Public Switching Telephone Network (PSTN) or Packet Telephony (PT) network). The objectionable effect of echo results from a combination of reflections from network components such as two- to four-wire converters (e.g., an impedance mismatch of a hybrid circuit, which is a device used to convert signals from a four-wire communication network interface to a two-wire local subscriber loop, and vice versa), together with signal processing and transmission delay. Echo may cause users difficulty in talking or listening over a telephone connection, and it may also affect the transmission of voiceband data, fax and text.

Echo cancellation can be used in a telecommunications network to ensure voice quality through elimination or reduction of electric or line echo from the telecommunications network. Echoes develop, or are created, in an "echo path," which is a system that includes all transmission facilities and equipment (including the hybrid circuit, the subscriber loop, and terminating telephone set) connected to the near end of an echo canceller.

An echo canceller is a device that can use adaptive signal processing to reduce or eliminate echoes to allow successful transmission of voice and/or voiceband data (such as modem and facsimile signals). Echo cancellers can be placed in the four-wire portion of a circuit, and reduce (or cancel) the echo by subtracting an estimate of the echo from the near end signal that includes the echo signal. For a more detailed discussion of echo cancellers, see the document entitled "Digital Network Echo Cancellers," which is published by The International Telecommunication Union's (ITU) Telecommunication Standardization Sector (ITU-T) as ITU-T Recommendation G.168.

One characteristic of a good echo canceller is rapid convergence. Convergence can be generally defined as the time the echo canceller needs to produce an estimate of an echo signal and reduce the echo signal below a threshold. In some echo canceller embodiments, multiple adaptive filters can be used, wherein results or data from a first adaptive filter can be used as an input to a second adapter filter. In such an echo canceller, faster filter adaptation in the first adaptive filter can improve performance of the overall echo canceller.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
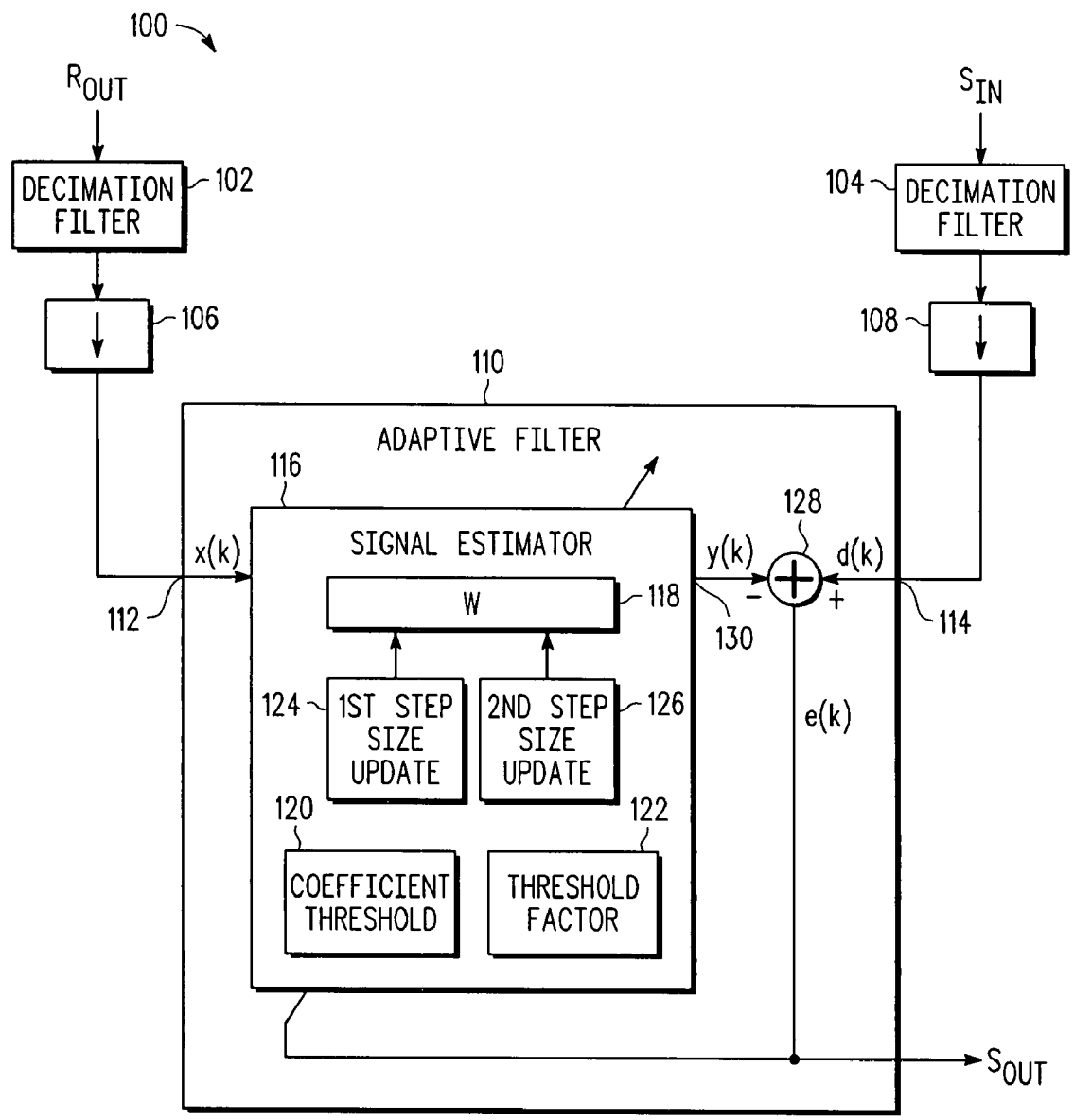
FIG. 1 is a high-level block diagram of an adaptive filter system in accordance with one or more embodiments.

Referring to FIG. 1, a high-level block diagram of an adaptive filter system in accordance with one or more embodiments will be briefly discussed and described. Note that many of the processes and functional blocks described hereinafter operate in the digital domain, wherein digital data can be used to represent speech or other data transmitted over a communication network. In the embodiment shown, adaptive filter system 100 can include decimation filters 102 and 104, and down samplers 106 and 108, which can be used to process and lower the data rate of signals $R_{out}$ and $S_{in}$, respectively. In an embodiment wherein filter system 100 is used in an echo canceller, signal $R_{out}$ can be a signal from the "far end" of a communication system, and signal $S_{in}$ can be a signal containing echo, which is produced by the "near end" portion of the communication system. Signal $S_{in}$ can also be referred to as a signal output from a network element, where a network element is a device (hardware or software) which provides services to one or more users (people or other devices) of the network. One such network element is a channel bank, which is a device that converts analog to digital signals or vice-a-versa. Signal $R_{out}$ can also be referred to as a signal input into a network element. Network elements may be viewed as having a transfer function which relates, e.g., input signals ($R_{out}$) to output signals ($S_{in}$).

Decimation filters 102 and 104 can be used to reduce the number of samples in discrete-time signals $R_{out}$ and $S_{in}$, respectively. The purpose of decimation filters 102 and 104 (which can also be referred to as "anti-aliasing filters") is to limit the spectrum of signals $R_{out}$ and $S_{in}$, so that a subsequent downsampling process (e.g., a process performed by a decimator, which can also be called a "downsampler") does not contribute to aliasing. The relationship between a signal spectrum width and a sampling rate is known in the art as the "Sampling Theorem," or the "Nyquist-Shannon Sampling Theorem." Since a realizable filter cannot limit the signal spectrum in an absolute sense, some traces of aliasing caused by the decimation process always exist, but they can be practically ignored if they are below an acceptable threshold (and/or comparable in terms of their energy to the noise that is almost always present in the system under consideration). In one embodiment, decimation filter 102 can reduce the bandwidth of the signal so that the number of samples can be reduced by 1:2, 1:4, 1:8, and the like, corresponding to downsampling rates of 2, 4, 8, respectively.

Downsamplers 106 and 108 can be used to reduce the sampling rate of signals $R_{out}$ and $S_{in}$, respectively. A downsampler (which can also be referred to as a "decimator" or "subsampler") is a functional entity (which can be realized practically using a hardware solution, or a software solution, or both) that receives a stream of signal samples $\{x_n, n=\ldots, -3, -2, -1, 0, 1, 2, 3, \ldots\}$ and outputs a stream of signal samples wherein only some of the samples belonging to the set $\{x_n\}$ are part of the output stream of signal samples. Downsampling is commonly a periodic operation with a constant downsampling factor (usually denoted by D or M). The output stream, $\{y_n\}$, can be related to the input stream as follows: $y_n = x_{n+D}$. In one embodiment wherein D=2, the output samples are equal to every second input sample (while the time distance between the adjacent decimated samples of stream $\{y_n\}$ is twice as large when compared to the distance between adjacent samples for $\{x_n\}$). Other practical viable decimation rates include D=2, 4, 8, 16. In one embodiment, downsamplers 106 and 108 can down sample by rates corresponding to D=4, or D=8, or the like. Note that in one embodiment, the decimation rate and filter rate can be set to D=1, which corresponds to decimation filters and down samplers that pass full rate signals without introducing any change to the signal characteristics.

After reducing the data rates of signals $R_{out}$ and $S_{in}$, signals $R_{out}$ and $S_{in}$ can be used as inputs to adaptive filter 110. Filtered and decimated signal $R_{out}$ can be input into input 112, where it can be referred to as signal x(k), or the far end filtered and decimated input signal. Filtered and decimated signal $S_{in}$ can be input into input 114, where it can be referred to as signal d(k), or the near end filtered and decimated input signal (including echo), which can be the output of the unknown system.

Within adaptive filter 110, signal estimator 116 can be used to produce or adapt a set of filter coefficients 118 (which coefficients are shown schematically in FIG. 1 as a box containing vector W). In one embodiment, filter coefficients 118 can be a set of multiplying factors (e.g., a vector of factors, usually comprised of real numbers), which can be used in or to provide a well known filter, e.g., a tapped-delay-line finite impulse response (FIR) filter which is adapted by changing or adapting the filter coefficients (FIR filter is part of Box with filter coefficients 118). Filter coefficients 118 can adapt to describe an impulse response of a connected linear system, which can produce an echo signal (e.g., a hybrid network at the near end, which is not shown in FIG. 1).

When an adaptive filter is used in an echo canceller application, adapting filter coefficients 118 in a short time (i.e., the convergence time of the filter coefficients) can be important to the overall voice quality of the echo canceller.

In the embodiment shown in FIG. 1, signal estimator 116 can further include coefficient threshold calculator 120, threshold adjustment factor processor 122, and first and second step size update processors 124 and 126, respectively. In one embodiment, coefficient threshold calculator 120 determines a coefficient threshold, or a value, that can be used to divide or segregate filter coefficients 118 into two or more groups of filter coefficients, wherein each group of filter coefficients can be updated using a different step size.

Figure 4:
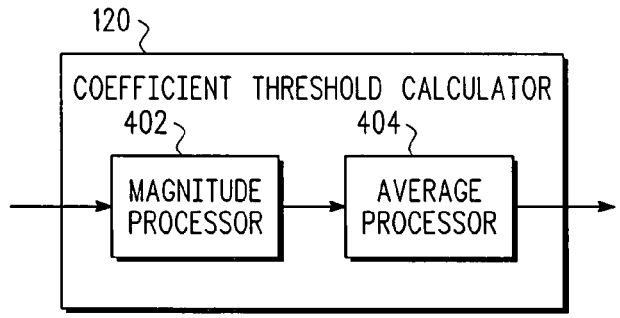
FIG. 4 is a high-level block diagram of a step size threshold calculator that can be used in the adaptive filter system of FIG. 1 in accordance with one or more embodiments.

In one embodiment, coefficient threshold calculator 120 can include a magnitude processor 402 and average processor 404, as shown in FIG. 4. Magnitude processor 402 can be used to determine a magnitude of each filter coefficient. Average processor 404 can be used to average the magnitudes of each filter coefficient, and set the coefficient threshold equal to such average.

Figure 5:
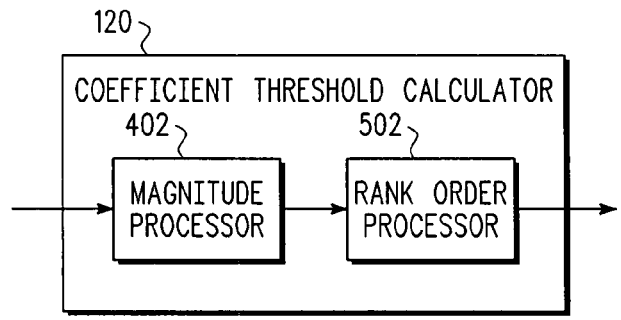
FIG. 5 is a high-level block diagram of a step size threshold calculator that can be used in the adaptive filter of FIG. 1 in accordance with one or more embodiments.

In another embodiment, coefficient threshold calculator 120 can include a magnitude processor 402 and rank order processor 502, as shown in FIG. 5. Rank order processor 502 can be used to determine the rank order of each filter coefficient magnitude, and to select the Mth largest magnitude, wherein M is an integer greater than or equal to one. The coefficient threshold can be set equal to such Mth largest magnitude.

In some embodiments, after the coefficient threshold value is determined, it can be modified or adjusted by a threshold factor, which factor can be stored in memory in threshold factor processor 122. Threshold factor processor 122 can fine-tune the adaptation algorithm by multiplying the one or more coefficient thresholds by a threshold factor in order to raise or lower the coefficient threshold and thus produce a modified coefficient threshold.

Filter coefficients 118 can each be updated by a selected one of two or more coefficient update processors, wherein each update processor uses a different update step size, and wherein the update processor selected for each filter coefficient is determined by the relationship between the filter coefficient magnitude and the coefficient threshold (or adjusted coefficient threshold). For example, in the embodiment of FIG. 1, a first step size can be used in first step size update processor 124 to update filter coefficients that are less than an adjusted coefficient threshold, and a second step size can be used in second step size update processor 126 to update filter coefficients that are greater than or equal to the adjusted coefficient threshold. As an example, a first step size having a value less than one can be assigned to filter coefficients with a magnitude less than the coefficient threshold, and a second step size having a value greater than one can be assigned to filter coefficients with a magnitude greater than or equal to the coefficient threshold. The coefficient updates in all update processors 124, 126 are based upon each respective update step size and upon a feedback signal (e.g., error signal e(k)). Once the update process calculates new filter coefficients, they can be output and stored in filter coefficients 118.

Signal estimator 116 can have an output 130 for outputting estimated signal y(k), which is a signal that should eventually adapt or converge to approximate the signal echo. Estimated signal y(k) can be coupled to an inverting input of adder 128. A noninverting input of adder 128 can be coupled to an output of down sampler 108 in order to receive signal d(k), which can be a signal containing echo. The output of adder 128 can be an error signal, e(k), which can indicate the difference between signals y(k) and d(k), and which can be used as a feedback signal for signal estimator 116.

In some echo canceller embodiments, signal e(k) can be output as signal $S_{out}$, which is a filtered signal without echo. This signal without echo can then be transmitted to the "far end" of the communications system, particularly if decimation filters 102 and 104 and downsamplers 106 and 108 are set using D=1 (e.g., no downsampling).

Figure 2:
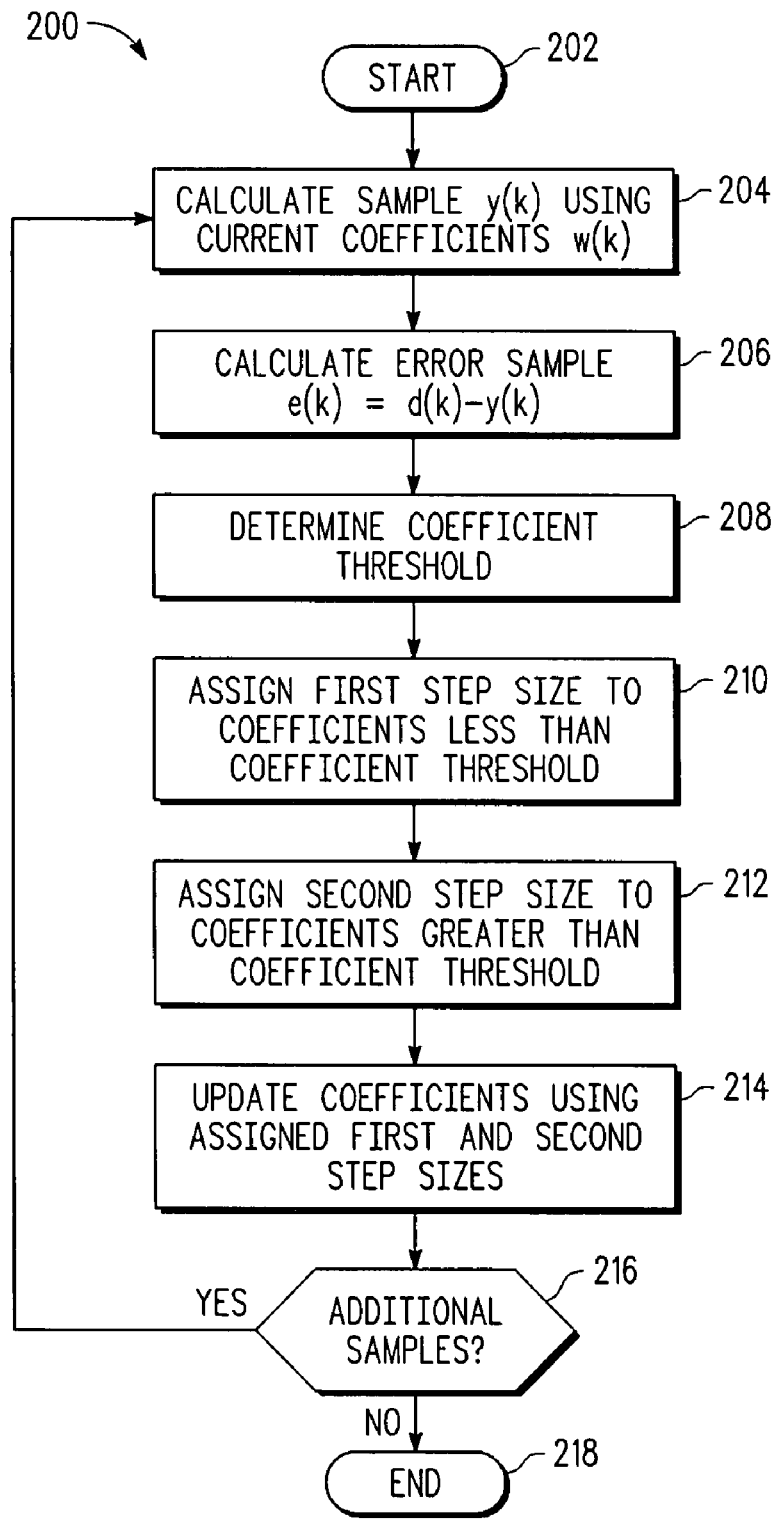
FIG. 2 is a flowchart of a process of using an adaptive filter in accordance with one or more embodiments.

Referring now to FIG. 2, there is depicted a high-level flowchart of processes that can be executed in adaptive filter 110 of FIG. 1 in accordance with one or more embodiments. As shown, the process begins at 202, and continues to 204 wherein the process calculates sample output y(k) (i.e., a next sample output by signal estimator 116, see FIG. 1) using the current coefficients of vector W. In one embodiment, this can be implemented within signal estimator 116 (see FIG. 1) using a finite impulse response (FIR) filter having a filter length N and filter coefficients W 118.

After calculating output sample y(k), the process calculates error sample e(k) according to the formula e(k)=d(k)−y(k), as depicted at 206. In one embodiment, calculating the error sample can be implemented using an adder, such as adder 128 in FIG. 1, wherein sample y(k) is input into an inverting input of the adder and sample d(k) is input into a noninverting input. The samples output by adder 128, which can be referred to as error signal e(k), represent the difference between estimated signal y(k) and the signal that can contain echo d(k).

Next, the process determines a coefficient threshold, as illustrated at 208. A coefficient threshold is a value that can be used to separate filter coefficients comprising vector W into two or more groups for further processing (e.g., filter coefficient updating). In one embodiment, a coefficient threshold can be calculated by using coefficient threshold calculator 120, which can determine a magnitude of the filter coefficients using, for example, magnitude processor 402 (see FIG. 4), and determine an average of the magnitudes of the filter coefficients w(k) 118 using, for example, average processor 404. The average value is then used as the coefficient threshold, wherein filter coefficients below the coefficient threshold are subsequently processed (e.g., updated) in one manner, and filter coefficients above (or equal to) the coefficient threshold are processed in another manner.

In another embodiment, the coefficient threshold can be determined by determining a magnitude of each filter coefficient using, for example, magnitude processor 402 (see FIG. 5), and then ranking the magnitudes of the filter coefficients using, for example, rank order processor 502, and setting the coefficient threshold equal to the magnitude of the $M^{th}$ filter coefficient (e.g. the $M^{th}$ largest coefficient). Thus, all filter coefficients having magnitudes greater than or equal to the $M^{th}$ largest filter coefficient can be subsequently processed in a first group in a first manner, while all filter coefficients having absolute values less than the $M^{th}$ largest filter coefficient can be processed in a second group in a second manner.

In some embodiments, more than one coefficient threshold can be used to separate filter coefficients into more than two groups for subsequent processing. For example, if two coefficient thresholds are used, three groups of coefficients can be created for subsequent processing.

In some embodiments, as a part of determining the threshold coefficient at 208, the process can adjust or change the coefficient threshold by using, for example, a threshold adjustment factor in threshold adjustment factor processor 122 (see FIG. 1). The threshold adjustment factor can be used to fine tune the adaptive filter system for better performance based on the underlying system characteristics. In one embodiment, coefficient threshold adjustment factor processor can be implemented with a multiplier that multiplies the initially determined coefficient threshold by a coefficient adjustment factor to raise or lower the coefficient threshold and thus produce a modified coefficient threshold.

Once the coefficient threshold has been determined and adjusted, if needed, the process assigns a first step size to filter coefficients with a magnitude less than the coefficient threshold, as depicted at 210. Similarly, the process assigns a second step size to filter coefficients with a magnitude greater than the coefficient threshold, as illustrated at 212. If a filter coefficient magnitude is equal to the threshold, it can be assigned either the first or the second step size, depending upon the adaptive filter design.

After assigning groups of coefficients to a respective update step size, the process updates filter coefficients using the respective assigned step sizes, as depicted at 214. In one embodiment, filter coefficients assigned to a first step size can be updated using first step size update processor 124, and filter coefficients assigned a second step size can be updated using a second step size update processor 126. If more than two update step sizes are needed, signal estimator 116 can include additional step size update processors that use additional step sizes for updating filter coefficients.

Updating filter coefficients using first and second step size update processors 124 and 126 can be implemented, in one embodiment, according to the following formulas:

for $i = 1$ to $L$ if $ww_i(k) > p \cdot w_{avg}(k)$ $g_i(k) > \alpha$ else $g_i(k) < \beta$ end wherein p is the threshold adjustment factor, $w_{avg}(k)$ is the average magnitude of the filter coefficients, and $\alpha$ and $\beta$ are the second and first step sizes, respectively.

A diagonal matrix of step sizes assigned to each corresponding filter coefficient can be expressed as:

$$G(k) = \text{diag}\{g_0(k), g_1(k), \ldots, g_{L-1}(k)\}$$

Thus, filter coefficients can be updated according to the formula:

$$w(k+1) = w(k) + \frac{\mu G(k)}{x^T(k)x(k) + \delta} x(k)e(k)$$

wherein $\mu$ is a fixed step size that is less than 1, x is the $R_{out}$ signal, e(k) is the error signal, and $\delta$ is a small value that prevents the denominator from being zero.

The step size used in the update processors directly affects how quickly the adaptive filter will converge. If the step size is very small, the filter coefficients change only a small amount at each update, and the adaptive filter converges more slowly. If a larger step size is used, more gradient information is included in each update, and the filter converges more quickly. If the step size is too large, the filter coefficients may change too quickly and the filter can diverge. The impulse response of an echo path can be sparse, which means that although the number of filter coefficients is large, only a small portion has significant values (i.e., active coefficients), while other filter coefficients remain near zero (i.e., inactive coefficients). By assigning large stepsizes to the coefficients with significant values, the convergence of the active coefficients can speed up, and thus the overall convergence speed can be increased. For inactive coefficients, small stepsizes can be assigned to ensure the stability of the adaptive filter while the slow convergence of these small coefficients does not affect the overall convergence.

After updating groups of filter coefficients using two or more update step sizes, the process determines whether additional samples are available for processing in the adaptive filter, as illustrated at 216. If additional samples are available for processing, the process iteratively returns to 204 and continues by calculating the next output sample y(k). If, however, there are not additional samples for processing, the process of adapting an adaptive filter ends, as depicted at 218.

While the process depicted in flowchart 200 ends at 218, the process can be iteratively repeated as needed in order to adapt adaptive filter system 100 so that it performs its function in whatever application it is used.

Figure 3:
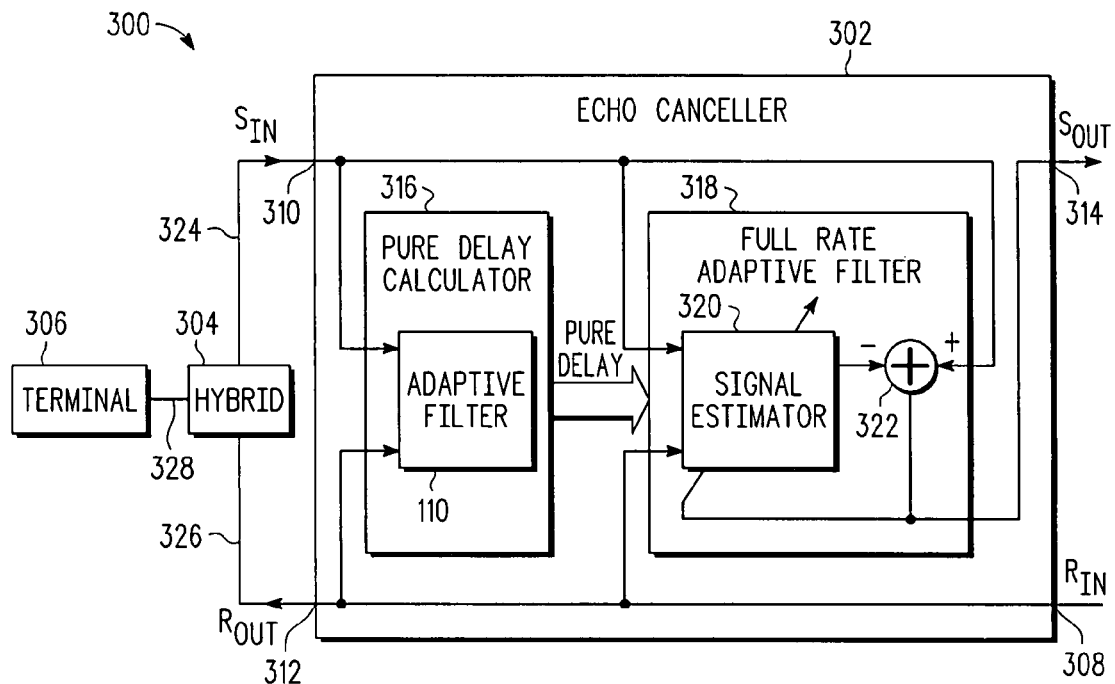
FIG. 3 is a high-level block diagram of a system for reducing an echo signal that uses the adaptive filter system of FIG. 1 in accordance with one or more embodiments.

Referring to FIG. 3, there is depicted a high-level block diagram of a portion of a communication network 300, which can include adaptive filter 110 in accordance with one or more embodiments. As illustrated, a part of communication network 300 can include echo canceller 302, which can be coupled, via a 4-wire connection 324, 326, to a linear system, such as hybrid 304. Hybrid circuits can introduce an impedance mismatch between communication network elements, which can cause the generation of an echo signal. The echo signal can be caused by impedance mismatches between electrical cables connecting the hybrid circuits and other network elements, and impedance mismatches in cables connecting the voice terminals or telephones sets, and mismatches with the input impedance of voice terminals. The echo signal can also be caused by, or changed by, electro-acoustical coupling between speakers and microphones in voice terminals (e.g., telephone sets). Additionally, echoes can be caused or changed by adding a bridged line or performing call forwarding in a call-in-progress scenario.

An echo signal can be an undesired, delayed copy, or delayed modified copy, of signal $R_{out}$ (i.e., a receive signal). If the signal is delayed by about 20-30 milliseconds, humans can begin to recognize the delayed signal as an echo. In some embodiments, the echo delay can be greater, even extending to hundreds of milliseconds for intercontinental telephone calls.

As illustrated, hybrid 304 can also be coupled via a 2-wire connection 328 to terminal 306, wherein terminal 306 can be a telephone set (e.g., a telephone handset), a modem, a facsimile machine, or other such terminal device adapted to be connected to a plain old telephone service (POTS) system.

Echo canceller 302 can have input 308 for signal $R_{in}$, and input 310 for signal $S_{in}$. Echo canceller 302 can have output 312 for signal $R_{out}$, and output 314 for signal $S_{out}$. These signals are discussed and described in the specification "ITU-T Recommendation G.168" published by the International Telecommunication Union Telecommunication Standardization Sector, and other similar documents. In some embodiments, signal $R_{in}$ can be a signal from the far end of a communication system. Signal $R_{out}$ can be the same as signal $R_{in}$ in some embodiments, such as the embodiment shown in FIG. 3. Signal $S_{in}$ can contain an echo signal, which echo canceller 302 will attempt to remove or reduce. Signal $S_{out}$ is the output of echo canceller 302, which signal should not contain any significant levels of the echo signal.

Echo canceller 302 can include pure delay calculator 316, which includes adaptive filter 110 coupled to input signals $R_{in}$ and $S_{in}$. Pure delay calculator 316 can output a pure delay signal (e.g. data) that represents a time delay of one or more echo signals in signal $S_{in}$. This pure delay signal can be input into full rate adaptive filter 318, which can use such delay data to locate and cancel or reduce the echo signal in order to produce output signal $S_{out}$. By using pure delay data, full rate adaptive filter 318 can have a shorter length (which means reduced power consumption and computational complexity) and still reduce or eliminate the echo signal.

Since adaptive filter 110 is configured and adapted to converge more quickly than a full rate adaptive filter, adaptive filter 110 can be used in pure delay calculator 316 to quickly locate an echo signal. Adaptive filter 110 can converge quickly because filter coefficients are divided into groups according to a coefficient threshold, and such groups of filter coefficients are updated using at least two different step sizes, as described above with reference to FIGS. 1 and 2. The convergence of adaptive filter 110 can also be accelerated by configuring adaptive filter 110 to operate on reduced-rate data (e.g., data that has been processed by decimation filters 102 and 104 and down sampled by decimators or downsamplers 106 and 108 (see FIG. 1) within pure delay calculator 316). Benefits of using decimation (i.e., with D>1) to reduce the sampling rate of signal $R_{out}$ and signal $S_{in}$ include: (a) using less computational power (i.e., using fewer CPU cycles) to adapt filter coefficients 118 in adaptive filter 110; (b) reducing component count (such as by reducing the number of FIR filter taps) and complexity of implementing an adaptive filter that covers the same echo path segment (i.e., the complexity reduction can include simpler provisions regarding the stability of the adaptive filter); (c) reducing numerical rounding errors (which are particularly important when numerical operations are implemented using fixed-point arithmetic); and (d) increasing the adaptive filter convergence speed, which contributes to better voice quality of the echo canceller system.

Once filter coefficients within adaptive filter 110 have been quickly adapted, the filter coefficients can be analyzed to produce pure delay information within pure delay calculator 316. In one embodiment, the pure delay information can represent a delay time associated with one or more coefficients having large magnitudes. For example, if an echo is present in signal $S_{in}$, several of the filter coefficients will have significant non-zero values (e.g., values that exceed a threshold, and that may have other predetermined characteristics) as a result of the adaptation. The pure delay can be defined as a time distance between the beginning of the impulse response and the time location of the impulse response absolute value that is significantly greater than the preceding values (e.g., impulse response absolute values that exceed a threshold). Alternatively, the pure delay can be a time distance between the beginning of the impulse response and the time location of the maximum value of the impulse response, reduced by the length of the preceding impulse segment that contains intermediate values between the maximum values and the average noise level value. Further analysis of the filter coefficients can be used to determine whether the filter coefficients have converged on an echo signal, or whether the filter coefficients are the result of noise (i.e., no echo).

Full rate adaptive filter can include full rate signal estimator 320 coupled to full data rate signals $R_{in}$ and $S_{in}$. Full rate signal estimator 320 can be implemented in various embodiments using any one of several known algorithms for adapting filter coefficients, such as the least mean square (LMS) algorithm, the Normalized Least Mean Squares (NLMS) algorithm, the Proportionate Normalized Least Mean Squares (PNLMS) algorithm, the Affine Projection (AP) algorithm, the Recursive Least Squares (RLS) algorithm, or the like. Setting a pure delay for the full rate main adaptive filter configures the filter to adapt filter coefficients in the relevant portion of the echo path impulse response domain (e.g., the filter is set to adapt to a delayed $R_{in}$ signal near the time of the undesired echo signal), thereby enabling the filter to converge faster and be implemented with a shorter length adaptive filter (e.g., a "sparse" adaptive filter, which is a filter having a length shorter than the actual echo path impulse response length that includes the pure delay portion).

The estimated signal output by full rate signal estimator 320, which signal should contain an estimated echo replica or estimated echo signal, can be input into an inverting input of adder 322. The other input of adder 322 can receive signal $S_{in}$. The output of adder 322 is an error signal, which signal is the difference between the estimated signal and signal $S_{in}$. This error signal is used both as feedback for signal estimator 320, and for the output signal $S_{out}$, wherein $S_{out}$ should have a significantly reduced echo signal once full rate adaptive filter 318 has converged. The convergence time can be defined as the interval between the instant a signal is applied to the $R_{in}$ input 308 of echo canceller 302 with the estimated echo path impulse response (e.g., the filter coefficients) initially set to zero, and the instant the returned echo level in error signal at output 314 reaches a defined level. The defined level need not be constant—it can be a function of the echo return loss (ERL) or other measurements of the linear system.

Although the invention is described herein with reference to specific embodiments, various modifications and changes can be made without departing from the scope of the present invention as set forth in the claims below. For example, while the techniques and apparatus for adapting adaptive filters and using adaptive filters to reduce an echo signal may vary widely, one or more embodiments can be used in public switched telephone networks, wireless networks, Internet networks, cellular networks, and other similar communication networks. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method in an adaptive filter comprising:
   calculating a signal estimator output using filter coefficients;
   calculating an error signal;
   determining a coefficient threshold;
   assigning a first step size to first filter coefficients of the filter coefficients, wherein the first filter coefficients have a magnitude less than the coefficient threshold, and assigning a second step size to second filter coefficients of the filter coefficients, wherein the second filter coefficients have a magnitude greater than or equal to the coefficient threshold;
   updating the first filter coefficients using the first step size and the error signal; and
   updating the second filter coefficients using the second step size and the error signal.

2. The method in an adaptive filter according to claim 1 wherein the determining a coefficient threshold comprises determining an average of magnitudes of the filter coefficients.

3. The method in an adaptive filter according to claim 1 wherein the determining a coefficient threshold comprises determining a magnitude of an Mth largest magnitude of the filter coefficients, wherein M is an integer greater than or equal to 1.

4. The method in an adaptive filter according to claim 1 wherein the determining a coefficient threshold comprises changing the coefficient threshold to produce a modified coefficient threshold by multiplying the coefficient threshold by a threshold factor, and further comprising, assigning the first step size to first filter coefficients with a magnitude less than the modified coefficient threshold, and assigning the second step size to second filter coefficients with a magnitude greater than or equal to the modified coefficient threshold.

5. The method in an adaptive filter according to claim 1 wherein the assigning the first step size to first filter coefficients having a magnitude less than the coefficient threshold, and assigning a second step size to second filter coefficients having a magnitude greater than or equal to the coefficient threshold comprises assigning a first step size having a value less than one to first filter coefficients having a magnitude less than the coefficient threshold, and assigning a second step size having a value greater than one to second filter coefficients having a magnitude greater than or equal to the coefficient threshold.

6. The method in an adaptive filter according to claim 1 wherein the calculating the signal estimator output comprises calculating an output sample of a finite impulse response filter using the filter coefficients, wherein the finite impulse response filter is adapted to receive a signal output from a network element and a signal input into the network element.

7. The method In an adaptive filter according to claim 1 wherein the calculating the error signal comprises subtracting the signal estimator output from a signal output from a network element.

8. An adaptive filter comprising:
   an adder having a non-inverting input coupled to an output of a network element, wherein the network element has a transfer function;
   a signal estimator for estimating the transfer function, wherein an estimated signal output by the signal estimator is coupled to an inverting input of the adder, and the signal estimator has an input coupled to an error signal output of the adder, and wherein the signal estimator comprises:
   a coefficient threshold calculator for calculating a coefficient threshold;
   a first step size update processor that uses a first step size and an error signal at the error signal output for updating first filter coefficients of a plurality of filter coefficients, wherein the first filter coefficients have a magnitude less than the coefficient threshold; and
   a second step size update processor that uses a second step size and the error signal at the error signal output for updating second filter coefficients of the plurality of filter coefficients, wherein the second filter coefficients have a magnitude greater than the coefficient threshold.

9. The adaptive filter according to claim 8 wherein the coefficient threshold calculator comprises an average processor for calculating an average of magnitudes of a plurality of filter coefficients in the signal estimator.

10. The adaptive filter according to claim 8 wherein the coefficient threshold calculator comprises a rank order processor for determining a filter coefficient with an Mth largest magnitude of a plurality of filter coefficients in the signal estimator, wherein M is an integer greater than or equal to one.

11. The adaptive filter according to claim 8 wherein the signal estimator further comprises a threshold factor processor for modifying the coefficient threshold by multiplying the coefficient threshold by a threshold factor.

12. The adaptive filter according to claim 8 wherein the first step size update processor that uses the first step size comprises a first step size update processor that uses a first step size that is less than one, and wherein the second step size update processor that uses the second step size comprises a second step size update processor that uses a second step size that is greater than one.

13. The adaptive filter according to claim 8 wherein the signal estimator further comprises a finite impulse response filter.

14. A system for reducing an echo signal comprising:
   a first adaptive filter having a first input for receiving a signal output from a network element, a second input for receiving a signal input into the network element, a third input for receiving pure delay information, and an output for outputting a signal having reduced echo;

a pure delay calculator for calculating the pure delay information, wherein the pure delay calculator has a first input for receiving the signal output from the network element, a second input for receiving the signal input into the network element, and an output coupled to the third input of the first adaptive filter for transferring the pure delay information; and a second adaptive filter in the pure delay calculator, wherein the second adaptive filter comprises:

an adder having a non-inverting input for receiving the signal output from the network element, wherein the network element has a transfer function;

a signal estimator for estimating the transfer function, wherein an estimated signal output by the signal estimator is coupled to an inverting input of the adder, and the signal estimator has an input coupled to an error signal output of the adder, and wherein the signal estimator comprises:

a coefficient threshold calculator for calculating a coefficient threshold;

a first step size update processor that uses a first step size and an error signal at the error signal output for updating first filter coefficients of a plurality of filter coefficients, wherein the first filter coefficients have a magnitude less than the coefficient threshold; and a second step size update processor that uses a second step size and the error signal at the error signal output for updating second filter coefficients of the plurality of filter coefficients, wherein the second filter coefficients have a magnitude greater than the coefficient threshold.

15. The system for reducing an echo signal according to claim 14 wherein the coefficient threshold calculator comprises an average processor for calculating an average of magnitudes of a plurality of filter coefficients in the signal estimator.

16. The system for reducing an echo signal according to claim 14 wherein the coefficient threshold calculator comprises a rank order processor for determining a filter coefficient with an Mth largest magnitude of a plurality of filter coefficients in the signal estimator, wherein M is an integer greater than or equal to one.

17. The system for reducing an echo signal according to claim 14 wherein the signal estimator further comprises a threshold factor processor for modifying the coefficient threshold by multiplying the coefficient threshold by a threshold factor.

18. The system for reducing an echo signal according to claim 14 wherein the first step size update processor that uses the first step size comprises a first step size update processor that uses a first step size that is less than one, and wherein the second step size update processor that uses the second step size comprises a second step size update processor that uses a second step size that is greater than one.

19. The system for reducing an echo signal according to claim 14 wherein the signal estimator further comprises a finite impulse response filter.

20. The system for reducing an echo signal according to claim 14 wherein the signal output by the network element comprises a filtered and decimated signal output by the network element, and wherein the signal input into the network element comprises a filtered and decimated signal input into the network element.

* * * * *

UNITED STATES PATENT AND TRADEMARK OFFICE
CERTIFICATE OF CORRECTION

PATENT NO. : 8,300,802 B2
APPLICATION NO. : 11/897872
DATED : October 30, 2012
INVENTOR(S) : Deng et al.

It is certified that error appears in the above-identified patent and that said Letters Patent is hereby corrected as shown below:

Column 10 line 11 after the word "method" please delete "In" and insert --in--

Signed and Sealed this
Twenty-second Day of January, 2013

David J. Kappos
*Director of the United States Patent and Trademark Office*